May 12, 1942. W. E. DUERINGER Re. 22,095
INDICATING AND POSITIONING SYSTEM
Original Filed Nov. 9, 1931
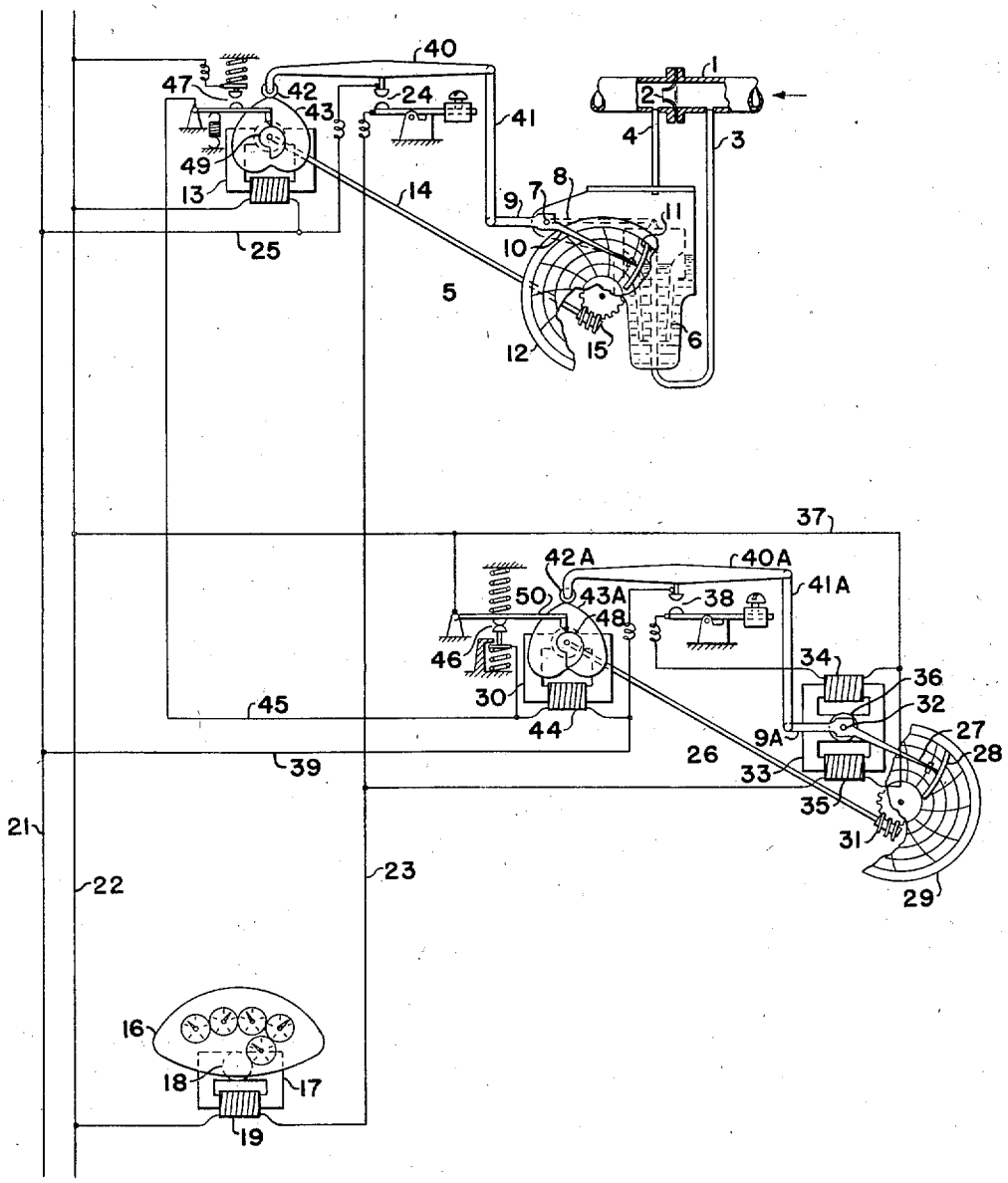
Inventor
Walter E. Dueringer
By Raymond W. Jenkins
Attorney Reissued May 12, 1942 Re. 22,095

UNITED STATES PATENT OFFICE 22,095

INDICATING AND POSITIONING SYSTEM

Walter E. Dueringer, Shaker Heights, Ohio, assignor to Bailey Meter Company, a corporation of Delaware Original No. 2,046,676, dated July 7, 1936, Serial No. 573,933, November 9, 1931. Application for reissue March 28, 1938, Serial No. 198,561

39 Claims. (Cl. 177—351)

This invention relates to improvements in positioning systems, and has especial reference to measuring instruments for variables, where an indication, record, or integration of the variable is desirably accomplished remotely, and where such variables may be of a physical, chemical, electrical, hydraulic or other nature. It contemplates remote synchronization of position, wherein the position of a member at one location, may be remotely reproduced. Such position of a member may be determined by the value of a variable to be remotely reproduced for indication, record, integration, use in control, etc. The position to be remotely reproduced may be a measure or indication of fluid level; or a condition such as temperature, pressure, quality or degree; or it may be merely the position of a movable object desirably remotely indicated.

In my invention I provide a system wherein it is possible to locate the indicator, recorder, register or other advising mechanism remotely from a measuring or feeling transmitting mechanism, although not necessarily so remotely. By this means the actuating members whose positions are determined responsive to that which is to be indicated, may be located in juxtaposition to apparatus or location remote from the point at which it is desired to visualize or learn such position representing a measure or indication, and kept in synchronism therewith.

One object of my invention is to provide an improved electrically actuated remote indicating or positioning system.

Another object is to provide for positioning remotely by means of a self-starting synchronous motor arranged for substantially instantaneous starting and stopping.

A further object is to provide an electrically operated positioning mechanism which may be located remotely at a considerable distance from its actuator.

Still another object is to provide a positioning system wherein an actuator remotely controls the positioning in synchronism with the actuator of a member which may be used for indicating or other purposes.

A still further object is to provide a remote recorder and indicator wherein the recording pen and the indicating pointer are positioned through the agency of a self-starting synchronous motor in synchronism with the measuring means or actuator remotely located.

With these and further objects in view, which will become apparent, I will now describe the drawing in which the one figure represents somewhat diagrammatically a preferred embodiment of the invention.

A variable such as the rate of flow of a fluid through a conduit 1 is desirably integrated with respect to time to give a total quantity of the fluid passing a given point during a specified interval of time such as the interval between two readings of a register. I show positioned within the conduit 1 a flow nozzle 2 forming a restriction to flow through the conduit and for creating thereby a pressure differential across the flow nozzle bearing a known relation to the rate of fluid flow therethrough. From the conduit 1 at opposite sides of the flow nozzle 2 I lead the pressure pipes 3 and 4 to a rate of flow meter indicated in general at 5.

Such a rate of flow meter may be of the liquid sealed bell type as disclosed in the patent to Ledoux, Number 1,064,748, granted June 17, 1913, wherein the bell is shaped and has walls of material thickness, to the end that the positioning of the bell is in direct proportion to the rate of fluid flow, thereby correcting for the quadratic relation which exists between rate of fluid flow through such a flow nozzle and differential pressure resulting therefrom. The bell is shown at 6 diagrammatically in dotted lines, and may be sealed by a liquid such as mercury whose approximate level within and without the bell is indicated.

The pressure within the conduit 1 ahead of the flow nozzle 2 is effective through the pipe 3 upon the interior of the bell 6, while pressure at the outlet of the flow nozzle 2 is effective through the pipe 4 upon the exterior of the bell 6, to the end that the bell is positioned vertically by the pressure differential across the flow nozzle and in linear relation to the rate of flow of the fluid.

Such vertical positioning of the bell results in an angular positioning, about a fixed fulcrum point 7, of an arm 8 for transmitting motion from the bell to the shaft of the fulcrum 7 for the positioning of an arm 9 whose function will be explained hereinafter and for positioning an indicating pen and pointer 10 cooperating with an index 11. The pen 10 is further adapted to record over a circular chart 12 which is desirably driven uniformly at a constant speed by a motor 13, illustrated as an electric motor, and drives the chart 12 through the agency of a shaft 14 and gearing 15.

In the embodiment illustrated I provide in connection with the flow meter 5, a register 16 desirably remotely located from the flow meter and having graduated dials with pointers moving in conjunction therewith for affording a continuously available means of reading the accumulated total of the rate of flow of fluid through the conduit 1. Such total flow for any desired time interval may be obtained by subtracting the reading of the dials of the register 16 at the beginning of the interval from the reading of the dials at the end of the interval, the difference between such readings representing the total flow between the beginning and the end of the interval of time, the arrangement being such that the total is the integration of the rate of flow of fluid with respect to time.

For driving the register 16 which in itself contains the necessary gear reduction between dials, I provide a self-starting single-phase synchronous motor 17 substantially independent of voltage changes and whose speed is directly and solely dependent upon the frequency of the alternating current supplied thereto.

The motor 17 has a rotor 18 comprising inherent speed reducing gears and adapted to cooperate with and drive the internal gearing of the register 16 when rotating.

As illustrated, the motor 17 has a field winding 19 for effecting rotation of the rotor 18 when energized.

The field 19 has one connection directly to the power line 22, while a second connection is made through a conductor 23, a contact 24 and a conductor 25 to the power line 21.

With the winding 19 energized a torque is developed thereby on the rotor 18 for rotation thereof in desired direction and corresponding actuation of the register 16 in a direction to increase the readings of the dials thereon. When the circuit is open to the winding 19 through the opening of contact 24, then the rotor 18 and the register 16 remain stationary.

The arrangement described is such that the rotation of the pointers relative to the dials of the register 16 is in direct relation to the time of rotation of the rotor 18 and correspondingly to the time during which the field coil 19 is energized.

I further provide in connection with the flow meter 5 a recording and/or indicating device 26 desirably remotely located from the flow meter 5 and from the register 16. As illustrated, an indicator arm 27 comprises a pointer cooperating with an index 28 and a pen for recording upon a circular chart 29 driven at uniform speed through the agency of a self-starting synchronous motor 30 and the gearing 31.

I cause an angular positioning of the indicator arm 27 around a fixed fulcrum shaft 32 by a synchronous electric motor 33 and having two field coils 34, 35 for causing rotation of a rotor 36 and corresponding angular movement of the pointer 27 in one direction or the other.

One terminal of the field 35 joins the conductor 23 leading to the contact 24 while the other terminal joins the power line 22 through a conductor 37. The field 34 has one terminal connected to the conductor 37 and the other terminal leads through a contact 38 and conductor 39 to the power line 21. It will be seen, then, that energization of the field winding 34 is controlled by the contact 38, while that of the field winding 35 is controlled by the contact 24.

When both the contacts 24 and 38 are open-circuited, the fields 34 and 35 are de-energized and no rotation of the rotor 36 occurs. Likewise, when both the contacts 24 and 38 are close-circuited, both of the field windings 34 and 35 are energized and the resulting equal opposing torque results in stationary positioning of the rotor 36 and of the indicator 27. If, however, the contact 24 is close-circuited, while the contact 38 is open-circuited, or vice versa, rotation of the rotor 36 will occur in one direction or the other through the energization of the field winding 34 or the field winding 35, with corresponding lack of application to the rotor of the equal opposing torque of the field winding which is at that time not energized. Such rotation of the rotor 36 in one direction or the other will result in a positioning, through the inherent gear reduction of the rotor 36, of the indicator 27 relative to the index 28 and the recording chart 29. It will therefore be apparent that I may cause a change in the reading on the index 28 or on the recording chart 29 of the indicator pointer 27 through the relative open- or close-circuiting of the contacts 24 and 38.

I have provided a register 16 for indicating the summation or integration of variables as well as a device 26 for indicating and/or recording the instantaneous value of variables, each or both operated by electrically actuated means and which may be remotely positioned from each other and from the actuator, the interconnection therebetween comprising electric conductors. At the point which I term the actuating point, namely the meter 5, I provide a means for making and breaking circuit to the field 19 of the register 16 and to the field 35 of the device 26, arranged so that the length of time during which the circuit is made is representative of the amount of actuation I desire to impart to the register. I preferably divide time into definite intervals and make electric circuit at the actuator during each interval of time for an increment of time length determined by the value of the variable to be integrated with respect to time, in this case the rate of fluid flow through the conduit 1. However, while the increment of time is in length primarily determined by the instantaneous value of the variable at the instant of initiating the increment, nevertheless the increment length is continuously modified throughout its duration in accordance with any change in the value of the variable throughout the duration of the increment.

Certain features of the actuator mechanism are disclosed and claimed in the patent to Harvard H. Gorrie for Integrating mechanisms, Number 1,892,183, granted December 27, 1932; while certain features of the actuator and of the remotely actuated integrator are disclosed and claimed in the patent to Rew E. Woolley for Integrating mechanisms, Number 1,892,184, granted December 27, 1932, both having the same assignee as the present application.

At the fluid meter 5 and in connection with the same I provide as an actuator or transmitting element, a circuit closing arrangement of which the contact 24 controls energization of the field windings 19 and 35 in parallel. One of the contacts 24 is carried by a pivoted weighted arm limited in its travel in one direction of rotation around the pivot. The cooperating contact is carried by and intermediate the ends of a freely floating member 40 capable of being positioned along a definite path in a single plane in space wherein a certain percentage of the travel in said path causes engagement and closure of the contact 24. The member 40 is pivotally connected at one end through a rod 41 to the arm 9 of the flow meter 5. The arrangement (on the drawing) is such that when there is zero fluid flow through the conduit 1, the bell 6 will be in its lowermost position and the righthand end of the member 40 in its uppermost position of travel. Conversely, when fluid flow through the conduit 1 is at 100% of capacity, the bell 6 will be in its uppermost travel position and the righthand end of the member 40 in its lowermost travel position. The righthand end of the member 40 thus traverses a predetermined path in a single plane in space.

The opposite end of the member 40 carries a roller 42 which by gravity bears against the surface of a cam 43 in a manner such that it is continually reciprocated, at a substantially uniform speed, between definite limits of travel, through rotation of the cam 43 driven at a uniform speed by the motor 13. The chart 12, for example, may be arranged to make one revolution in 24 hours, while the speed of the cam 43 might be in the nature of one revolution in 10 seconds. It will be seen, then, that the member 40 is arranged for positioning along a definite path within limits of travel in a single plane in space, such that movement of the member is angularly about either end by the positioning of the opposite end between definite limits of travel. The contact point carried by the member 40 is then positioned along a definite path in dependence upon the rate of fluid flow and upon a definite time reciprocation.

In the illustration, the roller 42 is at its uppermost travel limit, whereas the rate of fluid flow is indicated at approximately 50% of travel. When the rate of flow is zero and the righthand end of the member 40 at its uppermost position, then the reciprocation of the contact carried by the member 40, through reciprocation of the roller 42, will not cause closure of the contacts 24. However, when rate of fluid flow is maximum and the righthand end of the member 40 is at its lowermost position, then time reciprocation of the roller 42 causes closure of the contacts 24 throughout the entire or major portion of the reciprocation and consequent maximum actuation of the register 16, integrating the maximum fluid flow for which the system is designed.

Simultaneously, the maximum engagement of the contacts 24, for each time period representative of maximum rate of fluid flow will cause a maximum time energization of the field 35 for rotation of the rotor 36 in a direction tending to move the pointer 27 upward relative to the index 28 and outward relative to the chart 29 to indicate on the index and chart the maximum rate of fluid flow through the conduit.

Correspondingly, different percentages of maximum rate of fluid flow will cause integration on the register 16 at a uniform rate, but for a percentage of each predetermined time interval, depending upon the percentage of maximum rate of flow; and simultaneously, an energization of the field winding 35 for percentages of each predetermined time interval depending upon the rate of fluid flow.

It will be seen that, were the field winding 35 only effective upon the rotor 36, the movement of the indicator 27 would always be in the same direction, which would cause it very shortly to reach a maximum position of travel. I therefore provide the field winding 34 adapted for causing the rotor 36 to move in the opposite direction so that the indicator 27 may be moved in either direction and find a position corresponding to the position of the indicator arm 10 with which it is desirably to be synchronized.

I have duplicated in the device 26, the freely floating member 40 of the flow meter 5 as indicated at 40A. I indicate at 41A a rod connecting the righthand end of the member 40A with an arm 9A positioned by the rotor 36 simultaneously with the indicator 27. Thus the righthand end of the freely floating member 40A is positioned between definite limits of travel along a predetermined path in a single plane of space, the limits of travel corresponding to maximum and minimum position of the indicator 27. The lefthand end of the floating member 40A is reciprocated by a roller 42A carried by and on a cam 43A which is continuously rotated at a uniform speed by the motor 30.

The contact 38, as previously mentioned, is inserted between the conductor 39 and the field winding 34 to control the energization of same, and is adapted to be open- or close-circuited through reciprocation or position of the floating member 40A. The arrangement described is similar to, or duplicates, that of the meter 5 and is such that if the indicator 10 and the indicator 27 are in synchronism and the two cams 43 and 43A are in synchronism, then the contacts 24 and 38 will be simultaneously closed and opened throughout varying percentages of the time cycle of the cam, depending upon the value of the variable, in this case rate of fluid flow, which in addition to time is positioning the floating members 40 and 40A. If however, and still assuming that the cams 43 and 43A remain in synchronism, the righthand end of the member 40 is positioned to a different position than the righthand end of the member 40A, then either the field winding 34 or 35 will be energized alone for a portion of each time period, and cause a movement of the indicator 27 comprising a follow-up movement of the contact 38.

It will be seen in operation that if the rate of fluid flow through the conduit 1 increases, then the righthand end of the member 40 will be lowered an amount proportional to the increased rate of flow and correspondingly the contact 24 will be close-circuited for a longer percentage of the time period of revolution of the cam 43 than is the contact 38 for the same time period of rotation of the cam 43A, so that the field winding 35 will be energized alone for a time increment of the difference between the time of engagement of the contact 24 and that of the contact 38, whereby the pointer 27 will be moved upwardly on the chart 29 an amount proportional to such difference in time. Such movement of the indicator 27 will cause a change in the position of the righthand end of the floating member 40A and depending upon the magnitude of the change in the rate of fluid flow, then either in a single or in several revolutions of the time cams 43 and 43A, will be accomplished a synchronizing of the members 40 and 40A as well as the indicators 10 and 27. This will be understood, for in the example given, if the time of closure of the contact 24 is greater than that of the contact 38, whereby the field winding 35 is energized to cause an upward movement of the indicator 27, such upward movement will cause a downward movement of the righthand end of the member 40A whereby upon the next revolution of the cams 43, 43A, the contact 38 will be close-circuited for a greater length of time than previously, and such adjustment of the time closure of the contact 38 will continue until it is equal to the time closure of the contact 24.

If in operation the rate of flow of fluid decreases from that previously, then correspondingly the time of closure of the contacts 24 will be less than before, and the difference between the time of closure of the contact 24 and that of the contact 38 will be in the direction favoring the contact 38 to the extent that the contact 38 will have been closed a small time increment beyond that equal to the time of closure of the contact 24, whereby the field winding 34 will be energized alone for a short increment of time to cause movement of the pointer 27 downwardly and correspondingly of the righthand end of the member 40A upwardly until again the contacts 24 and 38 are closed for equal time lengths.

With the mechanism and system so far described, the register 16 accomplishes a summation or integration with respect to time of the rate of fluid flow indicated and recorded on the meter 5, while the remote measuring device 26 causes an indication and/or recording wherein the pointer 27 is moved in synchronism with the pointer 10 of the transmitting actuator 5. Such synchronization between the position of the indicator 27 and the indicator 10 is based primarily, of course, upon proper relative design of dimensions, speed, gear ratios, etc., as well as upon the keeping in synchronism of the motors 13 and 30. Although I have shown the motors 13 and 30 as connected across the same source of alternating current power 21, 22, wherein the similar motors will operate in synchronism as will the cams 43 and 43A, I further provide means for checking such synchronism, and if for some reason such as the momentary or prolonged stoppage of power to one of the motors, for example the motor 30, I correct for such lack of movement of the motor 30 as may have been caused by such a failure of power, to result in a resynchronizing of the cams 43, 43A.

The motor 13 is connected directly to the power lines 21, 22. One terminal of the field winding 44 of the motor 30 is connected through the conductor 39 to the power line 21, whereas the other terminal is connected in parallel through a conductor 45 to a normally close circuited contact 46 and a normally open circuited contact 47. By normally so, I mean that when normal operation occurs, with the motors 13 and 30 in synchronism, the contact 46 will be close-circuited, while the contact 47 will be open-circuited, and vice versa. The opening and closing of the said contacts 46, 47 is controlled by cams 48, 49 respectively, driven at a uniform speed by the motors 30, 13, simultaneously with the cams 43A, 43.

One of the contacts 46 is spring urged normally against a stop providing an upper limit of travel. The mating contact 46 comprises an arm 50, spring urged to mate with the first-named contact, pivoted at one end and carrying at its opposite end a nose adapted to ride on and engage the cam 48, the arrangement being such that the contacts 46 are close-circuited, except during a portion of the revolution of the cam 48 through which a high part of the cam acting upon the nose of the arm 50 moves the contact carried thereby away from its mating contact to open-circuit position.

The arrangement of the contacts 47 is similar, both contacts being spring urged separately, and in directions such that they are close-circuited only during that part of the rotation of the cam 49 corresponding to the open-circuited position of the contacts 46. The arrangement of both sets of contacts is such that when the motors 13 and 30 are in synchronism, then for a portion of the revolution of the two motors, the contact 46 is closed while the contact 47 is opened, and vice versa.

It will be seen that with such arrangement and normally so, the motor 30 is in continual rotation, for during one-half of the cycle of rotation of the cam 48 the contact 46 is closed, thus energizing the field winding 44, while during the alternate half revolution of the cam 48, the cam 49 of the motor 13 causes a closure of the contact 47 energizing the field winding 44 in parallel with the contact 46 which is at that time open-circuited, thus resulting in a continual rotation of the motor 30.

If, however, the power line to the motor 30 is momentarily de-energized, causing the motor to stop, then when power is again available at the motor 30, the staggering by half-cycles of the cam 48 and the cam 49 will not be exact, as previously, and rotation of the motor 30 will pause for a short interval during each cycle of rotation of the cam 49, until it again gets in step with the motor 13. The number of revolutions of the cam 49 which will occur before this resynchronizing is accomplished depends upon how far out of synchronism the cams 48 and 49 are at the time power is again made available for the field winding 44.

While I have illustrated and described a preferred embodiment of my invention in connection with the remote positioning or indicating of the flow of a fluid, the invention is by no means limited thereto, and may be used for remote synchronizing of position or indication of any variable or constant desirably remotely kept in step with a sender or actuator in itself representing a position.

It is not necessary that the exact mechanical and electrical arrangement shown be carried out, for I contemplate broadly a system whereby I may remotely indicate, record, integrate or otherwise show or advise an observer at a remote point the position of a member actuated in any desired manner.

I desire it to be understood that I am not to be limited by the embodiment shown, but only as to the claims in view of prior art.

What I claim as new and desire to secure by Letters Patent of the United States, is:

1. A positioning system comprising in combination, an electric circuit; a motor in said circuit having two similar and opposed windings, whereby when either winding is energized, the motor rotates in a given direction, and when both windings are energized, the motor is not urged to rotation; a first member; a time actuated element for continually moving said first member; an element responsive to the value of a variable for variably moving said first member; means operatively connecting said first member with the time actuated element and with the element responsive to the value of a variable, whereby the first member is jointly positioned by said two elements; means actuated by said first member to open the circuit to the first of said windings to permit the second then energized winding to rotate the motor in one direction; a second member; a second time actuated element for continually moving said second member; means connecting said second member with the second time actuated element and with the motor, whereby the second member is jointly positioned by said second time actuated element and by said motor; and means actuated by said second member to open the circuit to the second of said windings to permit the then energized first winding to rotate the motor in the opposite direction.

2. A positioning system comprising in combination an electric circuit; a motor in said circuit having two similar and opposed windings, whereby when either winding alone is energized the motor rotates in a given direction, and when both windings are energized, the motor is not urged to rotation; a first member; a time actuated element for continually moving said first member; an element responsive to the value of a variable for variably moving said first member; means operatively connecting said first member with the time actuated element and with the element responsive to the value of a variable, whereby the first member is jointly positioned by said two elements; a normally closed contact in the circuit to the first winding moved to open circuit position by said first member, to permit the second then energized winding to rotate the motor in one direction; a second member; a second time actuated element for continually moving said second member; means connecting said second member with the time actuated element and with the motor, whereby the second member is jointly positioned by said second time actuated element and by said motor; and a normally closed contact in the circuit to the second winding moved to open circuit position by said second member, to permit the first then energized winding to rotate the motor in the opposite direction.

3. A positioning system comprising in combination, an electric circuit; a first motor in said circuit; a second motor in said circuit; means responsive to the value of a variable; a first member; means operatively connecting said first member with the second motor for continually moving said first member and with the means responsive to the value of a variable for variably moving said first member, whereby the first member is jointly positioned by said second motor and by said means responsive to the value of the variable, the first member controlling the electric circuit to said first motor; a third motor in said circuit; a second member; and means connecting said second member with the third motor for continually moving said second member and with the first motor, whereby the second member is jointly positioned by the third motor and by the first motor, the second member controlling the electric circuit to said first motor.

4. A positioning system comprising in combination an electric circuit; a first motor in said circuit, having two similar and opposed windings, whereby when either winding is energized, the motor rotates in a given direction, and when both windings are energized, the motor is not urged to rotation; a second motor in said circuit; means responsive to the value of a variable; a first member; means operatively connecting said first member with the second motor for continually moving said first member and with the means responsive to the value of a variable for variably moving said first member, whereby the first member is jointly positioned by said second motor and by said means responsive to the value of the variable; means actuated by said first member to open the circuit to the first of said windings to permit the second then energized winding to rotate the first motor in one direction; a third motor in said circuit; a second member; means connecting said second member with the third motor for continually moving said second member and with the first motor, whereby the second member is jointly positioned by the third motor and by the first motor; and means actuated by said second member to open the circuit to the second of said windings to permit the then energized first winding to rotate the first motor in the opposite direction.

5. A positioning system comprising in combination an electric circuit; a first motor in said circuit, having two similar and opposed windings, whereby when either winding alone is energized, the motor rotates in a given direction, and when both windings are energized, the motor is not urged to rotation; a second motor in said circuit; means responsive to the value of a variable; a first member; means operatively connecting said first member with the second motor for continually moving said first member and with the means responsive to the value of a variable for variably moving said first member, whereby the first member is jointly positioned by said second motor and by said means responsive to the value of the variable; a normally closed contact in the circuit to the first winding moved to open circuit position by said first member to permit the second then energized winding to rotate the first motor in one direction; a third motor in said circuit; a second member; means connecting said second member with the third motor for continually moving said second member and with the first motor, whereby the second member is positioned jointly by the third motor and by the first motor; and a normally closed contact in the circuit to the second winding, moved to open circuit position by said second member, to permit the first then energized winding to rotate the motor in the opposite direction.

6. A positioning system comprising in combination an electric circuit; a first motor in said circuit; a second motor in said circuit; means responsive to the value of a variable; a first member; means operatively connecting said first member with the second motor for continually moving said first member and with the means responsive to the value of a variable for variably moving said first member, whereby the first member is jointly positioned by said second motor and by said means responsive to the value of the variable, the first member controlling the electric circuit to said first motor; a third motor in said circuit; a second member; means connecting said second member with the third motor for continually moving said second member and with the first motor, whereby the second member is jointly positioned by the third motor and by the first motor, the second member controlling the electric circuit to said first motor; a cam driven by the second motor; a contact actuated by said cam to close the circuit to the third motor during one-half of the cycle of rotation of said cam and to open the circuit to said third motor during the alternate one-half cycle of rotation; a cam driven by the third motor; a contact actuated by said last mentioned cam to close the circuit to the third motor during one-half of the cycle of rotation of said cam and to open the circuit to the third motor during the alternate one-half cycle of rotation, the cams and contacts being so arranged that the third motor continually rotates when the second and third motors are synchronized, but when said motors are not synchronized, said cams and contacts effecting a pause in the rotation of said third motor until said third motor again becomes synchronized with said second motor.

7. Mechanism for remotely indicating the value of a variable, comprising in combination an electric circuit; a first motor in said circuit; a second motor in said circuit; means responsive to the value of a variable; a first indicator; means connecting said indicator with the means responsive to the value of the variable; a first member; means operatively connecting said first member with the second motor for continually moving said first member and with the means responsive to the value of the variable for variably moving said first member, whereby the first member is jointly positioned by said second motor and by said means responsive to the value of the variable, the first member controlling the electric circuit to said first motor; a third motor in said circuit; a second member; means connecting said second member with the third motor for continually moving said second member and with the first motor, whereby the second member is jointly positioned by the third motor and by the first motor, the second member controlling the electric circuit to said first motor; a second indicator; and means connecting said second indicator with the first motor for actuation thereby.

8. A positioning system comprising in combination, an electric circuit; a motor in said circuit; a first member; a time actuated element for continually moving said first member; an element responsive to the value of a variable for variably moving said first member; means operatively connecting said first member with the time actuated element and with the element responsive to the value of a variable, whereby the first member is jointly positioned by said two elements, the first member controlling the electric circuit to said motor; a second member; a second time actuated element for continually moving said second member; and means connecting said second member with the second time actuated element and with the motor, whereby the second member is jointly positioned by said second time actuated element and by said motor.

9. A positioning system comprising in combination, an electric circuit; a motor in said circuit; a first member; an element responsive to an independent variable for continually moving said first member; an element responsive to the value of a variable for variably moving said first member; means operatively connecting said first member with the element responsive to an independent variable and with the element responsive to the value of a variable, whereby the first member is jointly positioned by said two elements, the first member controlling the electric circuit to said motor; a second member; a second element responsive to an independent variable for continually moving said second member; and means connecting said second member with the second element responsive to an independent variable and with the motor, whereby the second member is jointly positioned by said second element responsive to an independent variable and by said motor.

10. A positioning system comprising in combination, an electric circuit; a first electro-magnetic device in said circuit; a second electro-magnetic device in said circuit; means responsive to the value of a variable; a first member, means operatively connecting said first member with the second electro-magnetic device for continually moving said first member and with the means responsive to the value of a variable for variably moving said first member, whereby the first member is jointly positioned by said second electro-magnetic device and by said means responsive to the value of the variable, the first member controlling the electric circuit to said first electro-magnetic device; a third electro-magnetic device in said circuit; a second member; and means connecting said second member with the third electro-magnetic device for continually moving said second member and with the first electro-magnetic device, whereby the second member is jointly positioned by the third electro-magnetic device and by the first electro-magnetic device, the second member controlling the electric circuit to said first electro-magnetic device.

11. In a telemetric system, a first transmitting means for periodically telemetering electric impulse signals of a duration corresponding with a first variable, a second transmitting means for periodically and at least partially simultaneously with said first named transmitting means telemetering electric impulse signals of a duration corresponding to a second variable, and receiver means under the joint control of said signals.

12. In a telemetric system, a plurality of transmitting means, each of said means adapted to periodically originate electric impulse signals of a time duration corresponding to the magnitude of a variable, and receiver means jointly responsive to the signals from said transmitting means movable in each cycle of operation an amount corresponding to the difference in time duration of the signals originated by said transmitting means.

13. In a telemetric system, a first transmitting means for periodically telemetering electric impulse signals of a time duration corresponding to a first variable, a second transmitting means for at least partially simultaneously periodically telemetering electric impulse signals of a time duration corresponding to a second variable, and receiving means comprising an electro-responsive device having opposed windings under the joint control of said signals; one of said windings being energized for the time duration of the signals from said first named transmitting means and the other of said windings being energized for the time duration of the signals from the second named transmitting means.

14. In a telemetric system, an electromagnetic device having opposed windings and a member urged to movement when either of said windings alone is energized, a first transmitting means for periodically energizing one of said windings for a variable portion of each period, and a second transmitting means for periodically and at least partially simultaneously with said first named transmitting means energizing the other of said windings for a variable portion of each period, so that said member is urged to movement for an increment of time in each period of operation proportional to the difference in time duration of the energization of said windings.

15. A positioning system comprising in combination, a motor having two similar and opposed windings whereby when either winding alone is energized the motor rotates in given direction, and when both windings are energized the motor is not urged to rotation; a first transmitting means for periodically energizing one of said windings for a time increment corresponding to a first variable, and a second transmitting means for at least partially simultaneously periodically energizing the other of said windings for a time increment corresponding to a second variable, to periodically urge said motor to rotation for an increment of time corresponding to the difference in the time duration of the energization of said opposed windings.

16. In a telemetric system, a first transmitting means for periodically telemetering electric impulse signals of a time duration corresponding with the magnitude of a first variable, a second transmitting means for periodically telemetering electric impulse signals of a time duration corresponding with the magnitude of the second variable, receiver means having a first winding responsive to the signals from said first transmitting means and a second winding responsive to the signals from said second transmitting means, and a member in said receiver means urged to movement in one direction while said first winding alone is energized and to movement in opposite direction when said second winding alone is energized, whereby the net movement of said member during each period of operation is proportional to the difference in time duration of the energization of said windings.

17. In a system for telemetrically positioning a member in correspondence with changes in the magnitude of a variable, the combination of means for cyclically establishing electric impulses of a time duration corresponding to the magnitude of the variable, means for cyclically establishing electric impulses of a time duration corresponding to the position of said member; and means jointly responsive to said impulses for positioning said member in accordance with the difference in time lengths of said impulses.

18. In a telemetric system, a first transmitting means for periodically telemetering electric impulse signals of a time duration corresponding with a first variable, a second transmitting means for periodically telemetering electric impulse signals of a time duration corresponding with a second variable, receiver means jointly responsive to said signals, and means under the control of said receiver means for varying the magnitude of one of said variables in accordance with the difference in time duration of said first and second named signals.

19. In a telemetric system, a first transmitting means for periodically telemetering electric impulse signals of a time duration corresponding with a first variable, a second transmitting means for at least partially simultaneously periodically telemetering electric impulse signals of a time duration corresponding with a second variable, receiver means jointly responsive to said signals, and means under the control of said receiver means adapted to alter the magnitude of the second variable so as to bring the signals corresponding therewith into equal time duration with those corresponding with the first variable.

20. In a telemetric system, transmitting means for periodically telemetering electric impulse signals of a time duration corresponding with an independent variable, a second transmitting means for periodically telemetering electric impulse signals of a variable time duration, and means comprising a reversible motor movable an amount proportional to the difference in time duration of said first and second named signals for varying the time duration of said last named signals to make them equal in time duration to said first named signals.

21. In a system for maintaining a predetermined ratio between two variables cyclically telemetered by electric impulse signals of duration corresponding therewith, the combination of telemetric receiver means having a portion responsive to each of said signals, said receiver means including differential means responsive to the difference between receiver means signal responses, and means for controlling one of said variables actuatable by said receiving differential means to maintain the signals corresponding to said last named variable equal in time duration to those corresponding to the other of said variables.

22. In a telemetric system, a first transmitting means for periodically creating signals of a duration corresponding with a first variable, a second transmitting means for periodically creating signals of a duration corresponding with a second variable, receiver means under the joint control of said signals, and circuit controlling means under the control of both said transmitting means for automatically maintaining said transmitting means in synchronism.

23. In a telemetric system, a plurality of transmitting means each adapted to periodically propagate electric impulses of a time duration proportional to the magnitude of a variable, means for varying the speed of one of said transmitting means under the joint control of said transmitting means whereby the impulse of shortest time duration occurs during the increment in each cycle of operation when the impulse of longest duration is being propagated.

24. In a system for maintaining a predetermined ratio between two quantities cyclically telemetered by signals of durations corresponding therewith, the combination of telemetric receiver means for each quantity each having a portion responsive to its respective signal duration, said receiver means including differential means cyclically responsive to the difference between said receiver means signal responses, and means for controlling one of said quantities actuatable by said receiving differential means.

25. In a telemetric controller, transmitting means for cyclically telemetering signals of a duration corresponding with a master quantity, a second transmitting means for cyclically telemetering signals of a duration corresponding with a variable quantity, and means jointly responsive to said signals from both said transmitting means and adapted to alter said variable quantity so as to bring said signals into equality.

26. In a telemetric controller, transmitting means for cyclically telemetering signals of a duration corresponding with a master quantity, a second transmitting means for cyclically telemetering signals of a duration corresponding with a variable quantity, and means jointly controlled by said signals from both said transmitting means for bringing the value of said variable quantity into a predetermined relation with that of said master quantity.

27. In a telemetric controller, transmitting means for cyclically telemetering signals of a duration corresponding with a master quantity, a second transmitting means for cyclically and simultaneously telemetering signals of a duration corresponding with a variable quantity, and means jointly responsive to said signals from both said transmitting means and adapted to alter the value of said variable quantity to bring said value into correspondence with that of said master quantity.

28. In a telemetric controller, transmitting means for cyclically telemetering signals of a duration corresponding with a master quantity, a second transmitting means for cyclically telemetering signals of a duration corresponding with a variable quantity, and means comprising a reversible motor jointly controlled by said signals from both said transmitting means for altering said variable quantity to bring the value thereof into a predetermined relation with that of said master quantity.

29. In a telemetric controller, transmitting means for cyclically telemetering signals of a duration corresponding with a master quantity, a second transmitting means for cyclically telemetering signals of a duration corresponding with a variable quantity, and means comprising a reversible motor jointly controlled by said signals from both said transmitting means for altering said variable quantity to bring the duration of said signals into equality.

30. In a telemetric apparatus, a transmitter for cyclically creating signals of a duration corresponding with a master quantity, a second transmitter for cyclically creating signals of a duration corresponding with a variable quantity, means jointly controlled by said signals for bringing said variable quantity into predetermined relation with said master quantity, and means for automatically restoring synchronism between said transmitters upon loss of synchronism.

31. In a telemetric controller, a master transmitter adapted to cyclically set up impulses of a duration corresponding with a predetermined controlled quantity, means for affecting said quantity and displaceable through an extent corresponding therewith, transmitter means for said displacement, and motor means for positioning said quantity-affecting means operatively connected to each of said transmitters and adapted to so move said quantity-affecting means as to bring the durations of said impulses into equality.

32. In apparatus for telemetrically controlling a dependent quantity in relation with a master quantity; transmitting means for each quantity, each including means movable at constant speed and constrained to move in a predetermined path, means positionable relative to said movable means in correspondence with its said respective quantity, and contactor means jointly controlled by the coaction of said movable means with said positionable means to cyclically create a signal of a duration corresponding with its said respective quantity; and means jointly controlled by said signals to bring the value of said dependent quantity into a predetermined relation with that of said master quantity.

33. Telemetric control apparatus, as in claim 32, in which said movable means and said positionable means of one of said transmitting means are kinetically similar to the corresponding means of the other.

34. In a system for maintaining two cyclically telemetered quantities in a predetermined proportion, the combination of means for cyclically telemetering each of said quantities to a receiver, means for controlling one of said quantities and telemetric receiver means cyclically responsive to each of said quantities connected to said controlling means and adapted to actuate said controlling means when said predetermined proportion is departed from.

35. In a system for maintaining a predetermined ratio between two quantities cyclically telemetered by signals of a time-function corresponding respectively therewith, the combination of telemetric receiver means respectively responsive to said cyclical signals and means conjointly actuatable thereby for controlling one of said quantities.

36. In a telemetric proportioning system, the combination of means to cyclically telemeter one quantity, means to telemeter a second quantity, and means conjointly governed by said telemetering means for controlling one of said quantities to maintain the first of said cyclically telemetered quantities in a predetermined proportion to the second.

37. In a system for telemetrically positioning a second member in correspondence with the position of and changes in the position of a first member, the combination of means for cyclically establishing electric impulses of a time duration corresponding to the position of the first member, means for cyclically establishing electric impulses of a time duration corresponding to the position of the second member; and means jointly responsive to said impulses for positioning said second member in accordance with the difference in time lengths of said electric impulses.

38. In a system for maintaining a predetermined ratio between two variable physical quantities or conditions cyclically telemetered by electric impulse signals of durations corresponding therewith, the combination of telemetric receiver means having a portion responsive to each of said signals, said receiver means including differential means cyclically responsive to the difference between said receiver means signal responses, and means for controlling one of said conditions actuatable by said receiving differential means upon a departure of said one condition from a given value of the other of said conditions for maintaining said one condition substantially at said given value.

39. In a telemetric controller, transmitting means for cyclically telemetering electric impulse signals of a duration corresponding with values of a master independent variable, a second transmitting means for cyclically telemetering electric impulse signals of a duration corresponding with values of a variable physical condition subject to change with time, and means jointly controlled by said signals from both said transmitting means for maintaining said variable physical condition substantially at a given value of said master variable.

WALTER E. DUERINGER.